(12) United States Patent
Cargemel et al.

(10) Patent No.: US 6,430,686 B1
(45) Date of Patent: Aug. 6, 2002

(54) DISK SUBSYSTEM WITH MULTIPLE CONFIGURABLE INTERFACES

(75) Inventors: Laurent Cargemel, Avrillé ; Daniel Carteau, Montigny le Bretonneux; Jacques Delepoulle, Saint Germain de la Grange, all of (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/403,094

(22) PCT Filed: Mar. 15, 1999

(86) PCT No.: PCT/FR99/00573

§ 371 (c)(1),
(2), (4) Date: Oct. 15, 1999

(87) PCT Pub. No.: WO99/48014

PCT Pub. Date: Sep. 23, 1999

(30) Foreign Application Priority Data

Mar. 18, 1998 (FR) .............................................. 98 03316

(51) Int. Cl.$^7$ ............................................. G06F 15/177
(52) U.S. Cl. ............................................ 713/1; 713/100
(58) Field of Search ..................................... 713/1, 100

(56) References Cited

U.S. PATENT DOCUMENTS

| | | | |
|---|---|---|---|
| 5,396,596 A | * | 3/1995 | Hashemi et al. ............. 711/113 |
| 5,438,674 A | * | 8/1995 | Keele et al. .................... 711/4 |
| 5,603,039 A | | 2/1997 | Strevey |
| 5,628,637 A | | 5/1997 | Pecone et al. |

FOREIGN PATENT DOCUMENTS

| | | |
|---|---|---|
| DE | 32 04 160 A | 8/1983 |
| EP | 0 287 301 A | 10/1988 |
| EP | 0 570 168 A | 11/1993 |
| WO | WO 92 18934 A | 10/1992 |

OTHER PUBLICATIONS

"Small Computer System Inferface ID Translation", IBM Technical Disclosure Bulletin, vol. 37, No. 2b, Feb. 1994, p. 125 XP000433784, Armon, NY, USA—See entire document.

* cited by examiner

Primary Examiner—Dennis M. Butler
(74) Attorney, Agent, or Firm—Miles & Stockbridge P.C.; Edward J. Kondracki

(57) ABSTRACT

The present invention relates to a disk storage subsystem with multiple configurable interfaces, characterized in that it comprises at least one interface adapter board (1a, 1b), at least one drawer (4), each comprising a plurality of disks (20), each drawer (4) being connected to an adapter board (1a or 1b) by SCSI disk interfaces (2), a first adapter board (1a or 1b) comprising a switch (11) for modifying the addressing system of the disks (20) of at least one drawer (4), the adapter board or boards (1a, 1b) each comprising two independent single-ended/differential-ended SE/DE converters (7), each SE/DE converter (7) being connected to a drawer (4) and fed by either of two direct current/direct current DC/DC converters (7) of the adapter board (1), and two external SCSI connectors (10) being connected to each SE/DE converter (7).

12 Claims, 8 Drawing Sheets

DISK SUBSYSTEM WITH MULTIPLE CONFIGURABLE INTERFACES

BACKGROUND OF THE INVENTION

1. Field of the Invention

The present invention relates to a disk storage subsystem with multiple configurable interfaces used as mass storage for a computer system.

2. Description of Related Art

Mass storage applications for computers require more and more storage capacity and greater protection of the stored data (no loss of data as a result of a failure). Added to this is a concern for availability, the user being in need of highly reliable systems capable of operating continuously, even when maintenance of the systems is necessary.

There are two types of subsystems currently offered: the subsystems JBOD (Just a Bunch Of Disks) or RAID (Redundant Array of Inexpensive Disks). The JBOD (or direct disk attachment) subsystems are the simplest and the least expensive. They require only a small computer system interface (SCSI) adapter board to connect up to 4 6-disk drawers to host systems. It is possible, through the operating system, to produce duplications (mirroring) from one disk to another, and hence to secure the data so as to be protected against a disk failure.

The drawback of these systems is that the configurations are fixed (2 SCSI interfaces with a maximum of 12 disks) and therefore do not cover all the users' needs. These systems do offer good protection of the data, because of the mirroring, but in case of a defect, for example of an element of the adapter board, the subsystem is no longer operational.

RAID systems can comprise two controllers, one of which makes it possible, in case of a failure of the other, to guarantee the correct operation of the disk storage subsystem, for example by connecting a first controller with the host and the second controller with the same host, but using different connections.

RAID subsystems are very high-cost due to the costs of the controllers and the cache memory required, and in some cases their performance is disappointing as compared to disks used in the conventional way. Moreover, the number of configurations is limited.

SUMMARY OF THE INVENTION

The object of the present invention is to eliminate the drawbacks of the prior art by offering a high-performance JBOD subsystem with very high availability, making it possible to protect a large volume of data, and allowing a wide choice of possible operating configurations.

This object is achieved by the fact that the disk storage subsystem with multiple configurable interfaces is characterized in that it comprises at least one interface adapter board, at least one drawer, each comprising a plurality of disks, each drawer being connected to an adapter board by SCSI disk interfaces, a first adapter board comprising a switch for modifying the addressing system of the disks of at least one drawer, the adapter board or boards each comprising two independent single-ended/differential-ended SE/DE interface converters, each SE/DE converter being connected to a drawer and fed by either of two direct current/direct current DC/DC converters of the adapter board, and two external SCSI connectors being connected to each SE/DE converter.

According to another characteristic, the switch is a hardware switch of the dual in-line switch type or a software switch.

According to another characteristic, the switch adds a constant value to the addresses of the disks of two drawers, this value preferably being equal to 8.

According to another characteristic, the SCSI interfaces that connect the drawers of disks to the controller card are of the single-ended SE type.

According to another characteristic, the SCSI interfaces that connect the adapter board to the host systems are of the differential-ended DE type.

According to another characteristic, each SE/DE converter is connected by a V connection to two connectors accessible to the outside of the subsystem for connecting either line terminators or bus adapters of a host machine.

According to another characteristic, each of the direct current/direct current DC/DC converters of the blocks of SE/DE converters distributes a voltage to the two SE/DE converters of the corresponding blocks by means of an "wired OR."

According to another characteristic, the adapter board comprises a daughterboard, this daughterboard making it possible, in a first position, to connect the adapter board to two given disk drawers, and in a second position, to connect the adapter board to two drawers of disks different from those of the first position.

According to another characteristic, a link joins two connectors of two SE/DE converters, thus producing a chaining of two drawers of disks.

According to another characteristic, the SCSI disk interfaces connecting the drawers of disks and/or the SCSI disk interfaces connecting the adapter board or boards to the host systems are the Ultra/Vide type and hence support a maximum data rate of 40 megabytes/s.

According to another characteristic, the line terminators that are not located in the disk drawers are incorporated into each daughterboard of each associated adapter board.

BRIEF DESCRIPTION OF THE DRAWINGS

Other characteristics and advantages of the present invention will appear in the description of the figures, in which.

DESCRIPTION OF THE PREFERRED EMBODIMENTS

The JBOD subsystem is a direct disk attachment. This subsystem is connected to a host system and, through an operating system, it is possible to produce duplications (mirrors) of disks in the same subsystem. The JBOD system does not have any functionality in itself, except for the fact that it is designed to provide reliability and maximum high availability.

The SCSI interfaces are constituted by lines, each end of which ends in a line terminator. A Wide SCSI interface is defined by a data bus comprising 8 data bits and one parity bit, a data or command/response bus comprising 8 bits and one parity bit, and 9 other signals. It is possible to connect up to a maximum of 16 objects, which can be either disks or host systems. The SCSI interfaces are of various types:

Narrow SCSI, with a data rate of 5 megabytes/second (MB/s)
Fast SCSI, with a data rate of 10 megabytes/s
Fast/Vide SCSI, with a data rate of 20 megabytes/s
Ultra/Vide SCSI, with a data rate of 40 megabytes/s.

The Narrow and Fast types of SCSI interfaces are 8-bit types, and the user can connect them to 8 objects maximum. The Fast/Vide and Ultra/Wide SCSI interfaces are 16-bit types, and the user can connect them to 16 objects maximum. There are two kinds of SCSI interfaces, the single-ended SE kind, which has a line length limited to between 3 and 6 meters, and the differential-ended DE kind, which allows a line length of up to 25 meters. The first kind SE uses the open collector technique, and the signal is transmitted through only one link, the return taking place through the ground. The second kind DE requires two wires, each of which transports information in one of the opposing directions (differential technique).

Figure 3:
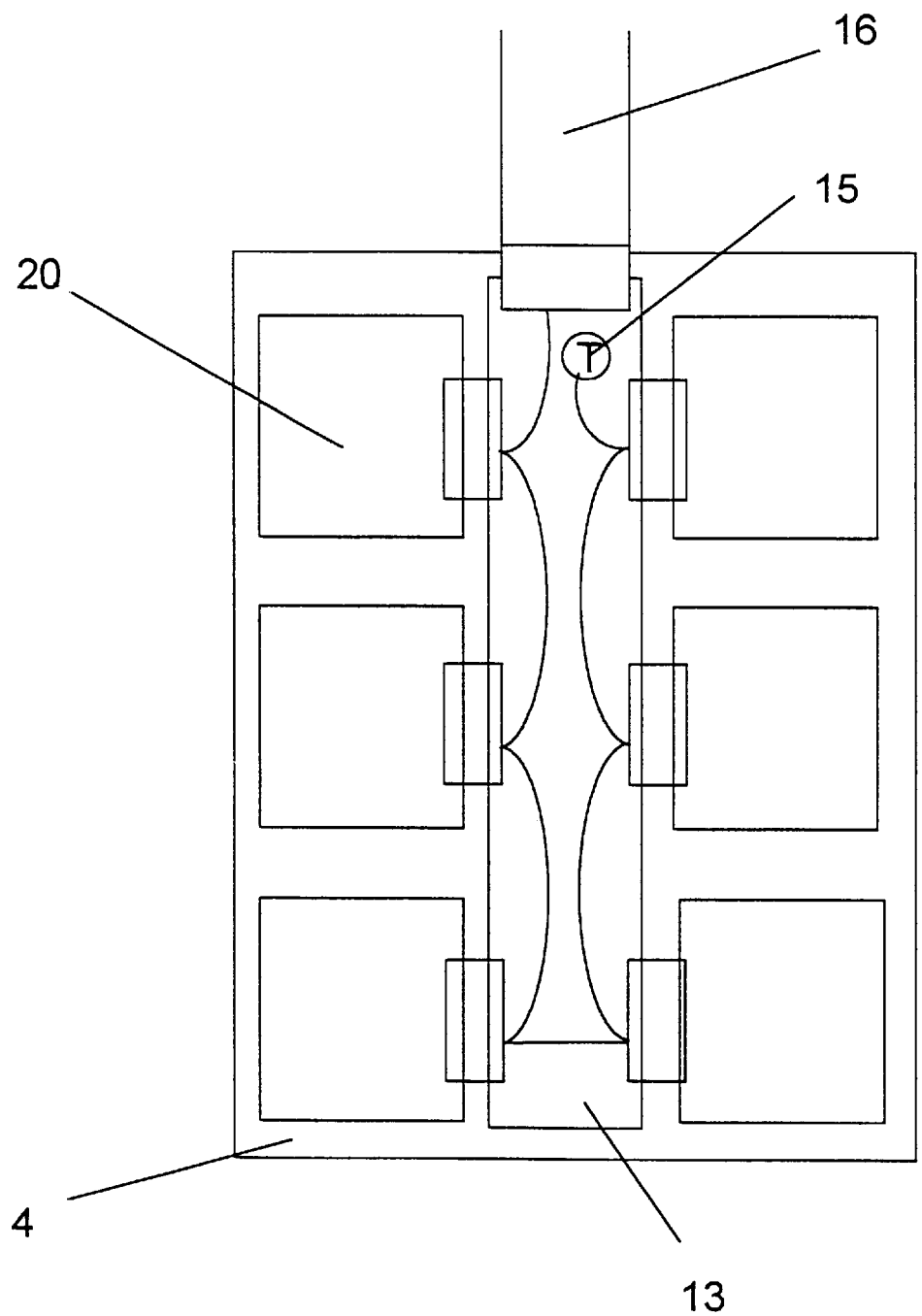
FIG. 3 represents a block diagram of the subsystem according to the invention illustrating chaining between the disks in a drawer.

FIG. 3 represents a diagram of the chaining between the disks in a drawer. A Fast/Wide or UltraWide SCSI interface can receive 16 objects, the purpose of the chaining being to create the fewest possible junctions, since these disturb the signals. The number of objects is limited by the number of addresses, which is fixed. By limiting the number of connections to the SCSI interface, noise and disturbances in this interface are reduced. A disk drawer (4) can contain, for example, up to 6 disks (20). The SCSI SE interface of the disks (20) is chained to a printed circuit board (13). The incoming SCSI interface is formed by a flat cable (16) connected by chaining to the 6 disks (20, FIG. 3) and ending in line terminations (15). If one or more disks (20) are absent or disconnected, the SCSI interface is not cut off and the system can continue to function.

Figure 1:
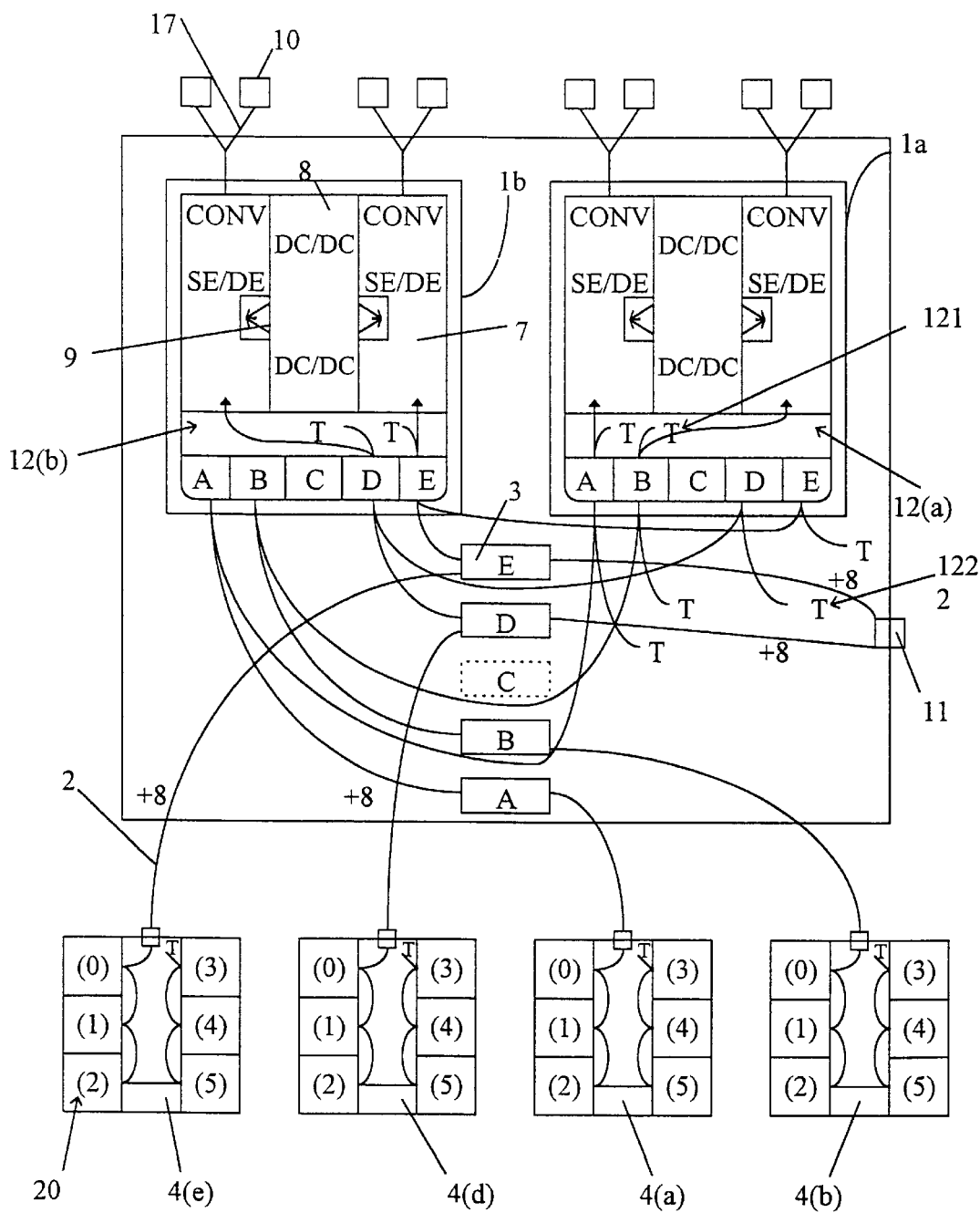
FIG. 1 represents a block diagram of the subsystem according to the invention.

FIG. 1 represents a block diagram of the subsystem according to the invention. Represented in FIG. 1 are two identical adapter boards (1a, 1b) and four drawers (4) that can contain, for example, up to six disks (20) each. This exemplary configuration is given only as an illustration, and does not constitute a limitation of the invention to this configuration. In fact, it is possible to envisage a configuration of the subsystem according to the invention comprising a different number of adapter boards (1), drawers and disks. For each drawer (4), the addresses of the disks (20) are numbered, for example from 0 to 5. The drawers (4) are connected to an adapter board (1) by SCSI SE (single-ended) interfaces (2), for example of the Ultra/Vide type. Each adapter board (1a, 1b) is connected to at most two connectors (3) of drawers (4) of disks (20), through a daughterboard (12a, 12b) located on each adapter board (1a, 1b). The system of daughterboards (12a, 12b) makes it possible to define two identical adapter board assemblies (1a, 1b). Each daughterboard (12a, 12b) has two positions on its associated adapter board (1a, 1b). In a first position, the daughterboard (12a or 12b) allows the associated board (1a or 1b) to connect to two connectors (3, A and B) connected to two drawers (4(a), 4(b)). In a second position, the daughterboard (12a or 12b) allows the associated board (1a or 1b) to connect to two other connectors (3, D and E) connected to two drawers (4(d), 4(e)). When the subsystem according to the invention comprises two adapter boards (1a, 1b), as represented in FIG. 2, the positions of each daughterboard (12a, 12b) on each associated adapter board (1a, 1b) must be different, in order to prevent the same drawer (4) from being connected to two adapter boards (1a, 1b). An automatic device (not represented), for example with an LED display, warns the user in case of an incorrect mounting of the daughterboards (12a, 12b) on the associated adapter boards (1a, 1b), for example in case of a bad connection, a failure to connect the daughterboards (12a, 12b) or an incorrect positioning on the associated adapter board (1a or 1b). Advantageously, the line terminators of the adapter boards (1a, 1b) are either incorporated into the daughterboards (12a, 12b) or located outside the adapter boards (1a, 1b). In a variant of embodiment in which the terminators (121) are incorporated into the daughterboards (12a, 12b), the terminators (122) located outside the adapter boards (1a, 1b) are eliminated. In a variant of embodiment in which the terminators (122) are located outside the adapter boards (1a, 1b), the terminators (121) incorporated into the daughterboards (12a, 12b) are eliminated. In the example represented in FIG. 1, a first daughterboard (12a) is mounted in the first position on its associated adapter board (1a), and a second daughterboard (12b) is mounted in the second position on its associated adapter board (1b). Each adapter board (1a, 1b) also comprises two SE/DE converters (7) connected to the associated daughterboard (12a or 12b). The converters (7) of each adapter board (1) are independent, and have their own clocks. Therefore, there is no possible fault propagation from one SE/DE converter to the other. The blocks (6) of SE/DE converters (7) are fed by two direct current/direct current DC/DC converters (8) that transform the general DC supply voltage of the subsystem, which is on the order of 24 volts, into a specific voltage of 5 volts, stabilized for each SE/DE converter (7). But each of the two DC/DC current converters (8) distributes the current to both SE/DE converters (7) of the same block, for example by means of a "wired OR" (9). Thus if one of the two DC/DC current converters is defective, the other feeds both SE/DE converters (7). Each SE/DE converter (7) of the disk storage subsystem can be connected to the outside by two connectors (10). The subsystem according to the invention is connected to the host system by SCSI DE interfaces (17). A first adapter board (1b) is connected to a switch (11). This switch can be a hardware switch, for example a dual in-line switch, or a software switch. This switch (11) is connected to at least one connector (3) of drawers (4) of disks (20), for example to the connectors D and E (3) of the drawers (4(d), 4(e)) of disks (20) of a first adapter board. When it is active, the switch (11) modifies the addressing system of the drawers (4(d), 4(e)) to which it is connected, for example by adding a constant value, for example +8, to the addresses of the disks (20) of the two drawers (4(d), 4(e)) connected. The addresses of the disks (20) of the two drawers (4(d), 4(e)) connected to the switch (11) therefore go from the 0 to 5 value range to the 8 to 13 value range.

FIGS. 2A through 2F represent a simplified block diagram of non-limiting examples of possible configurations of the subsystem according to the invention in a variant compatible with JBOD (Just a Bunch of Disks). For purposes of simplification, the daughterboards (12a, 12b) are not represented, and only the physical links of the adapter boards (1) with the connectors (3) of drawers (4) of disks (20) are represented. In one configuration, represented in FIG. 2F, the user can connect, for example, each of four host systems (100(a), 100(b), 100(c), 100(d)) to a SCSI of six disks (20).

Figure 2A:
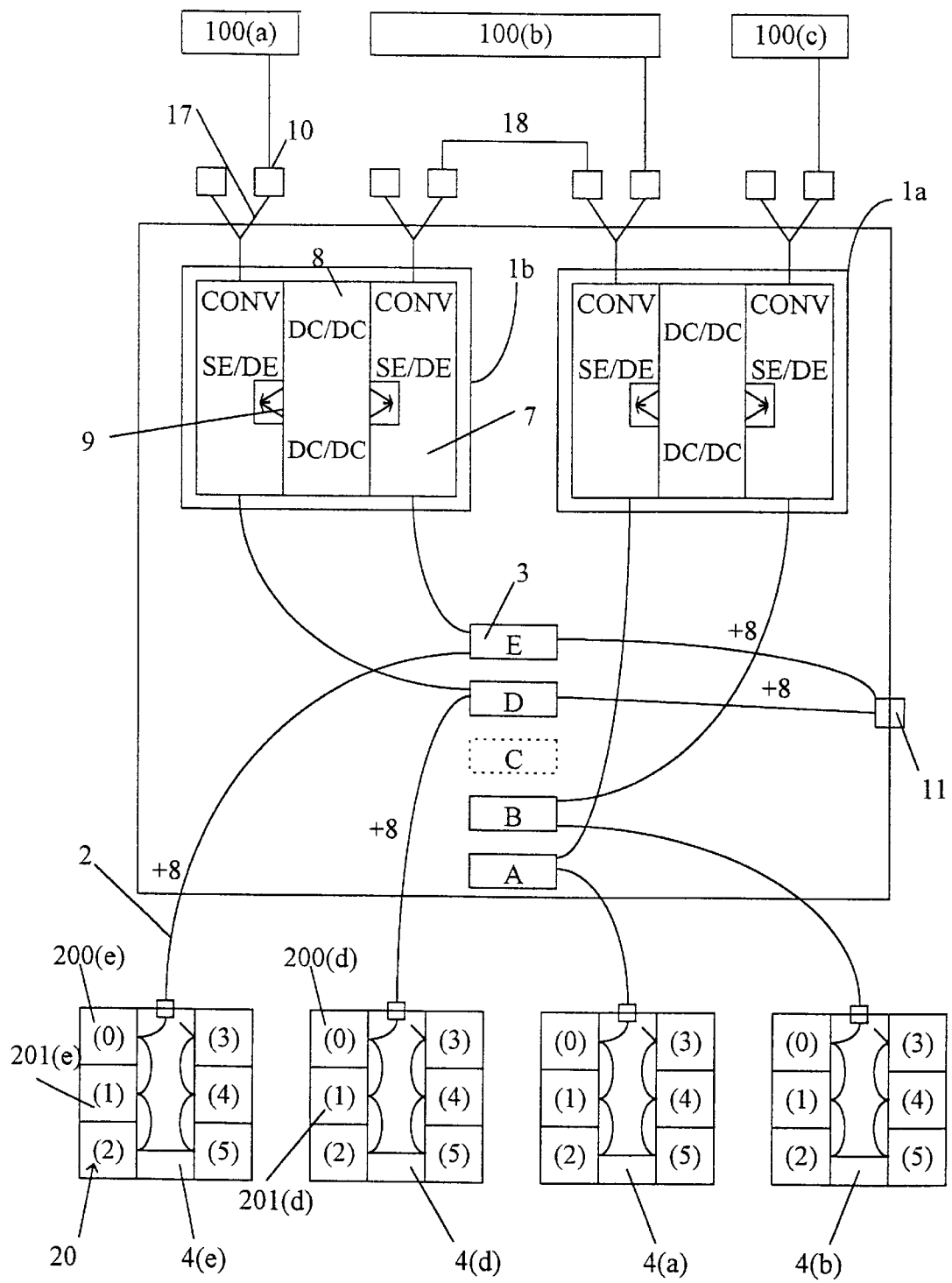
FIGS. 2A through 2F represent simplified block diagrams of non-limiting examples of possible configurations of the subsystem according to the invention in a variant compatible with JBOD (Just a Bunch of Disks)
Figure 2B:
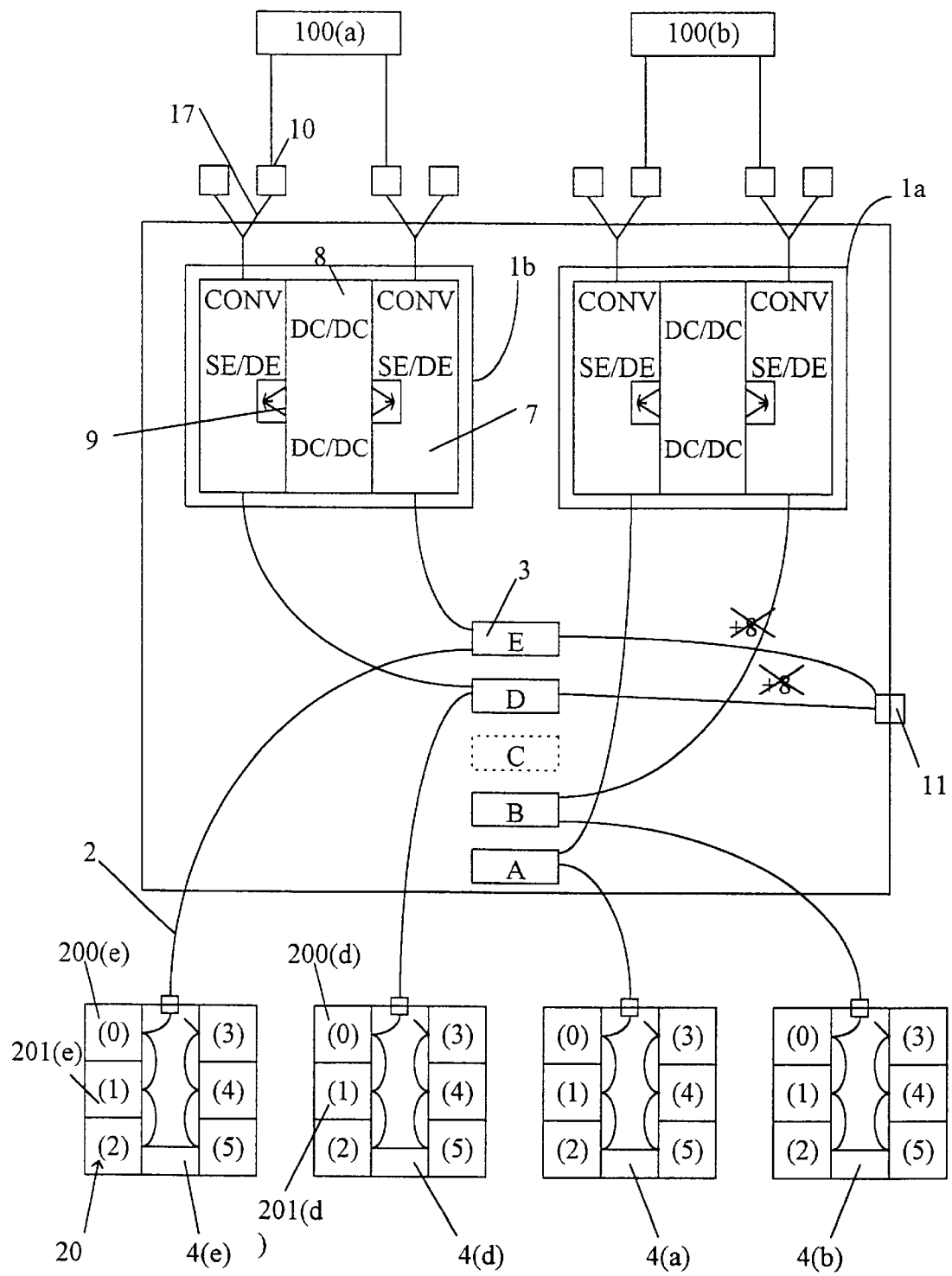
Figure 2C:
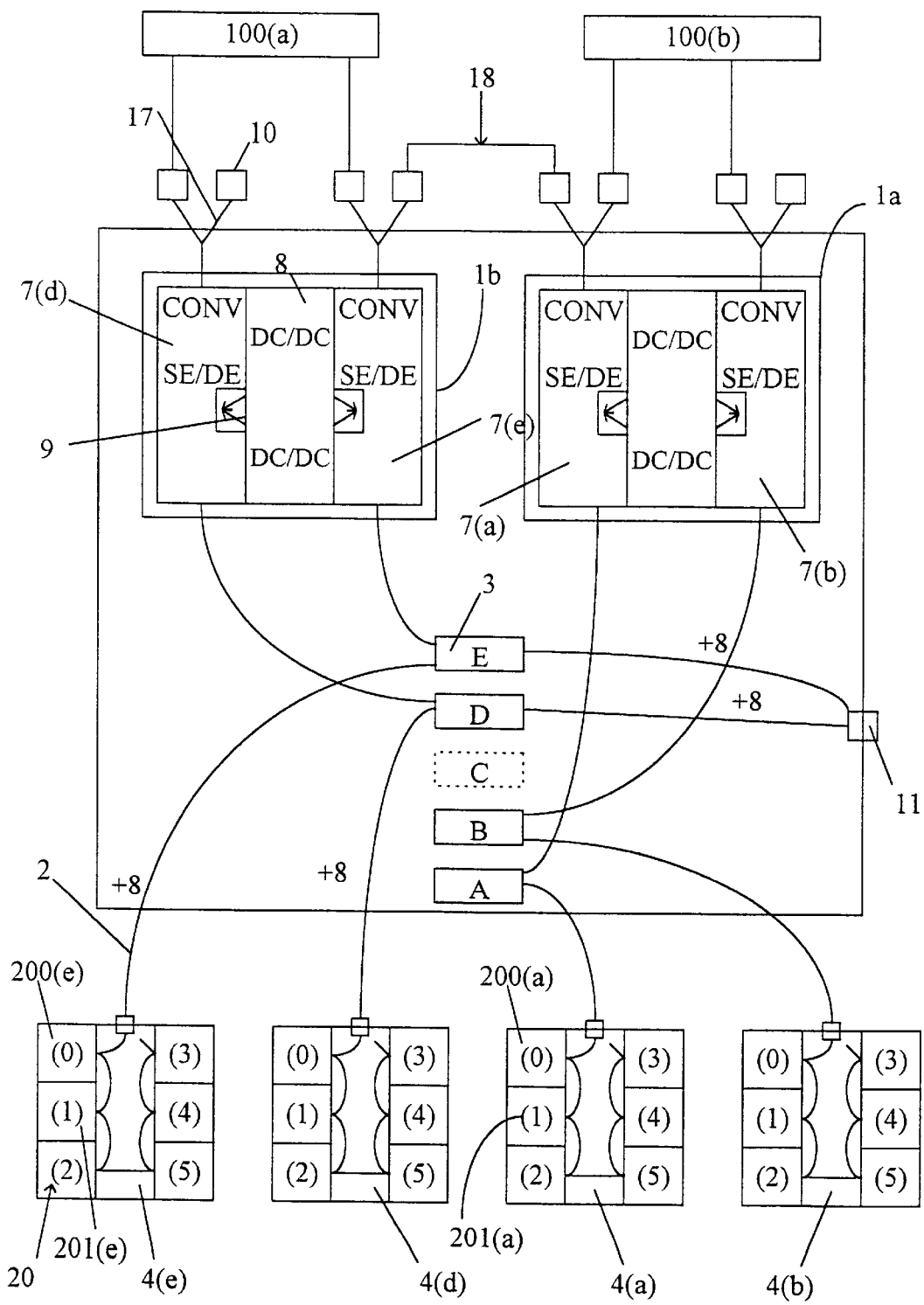

The installation of two connectors (10) per SE/DE converter (7) makes it possible to produce an external chaining, between two SE/DE converters (7) of different adapter boards (1a, 1b). As represented in FIGS. 2A and 2C, it is possible to join together two SCSIs of different boards (1a, 1b), by means of a link (18) located between two connectors (10) of SE/DE converters (7) of two different boards (1a, 1b). In this configuration, there is an address conflict, since the disks (20) of two connected drawers (4) have the same addresses. The switch (11) in this particular configuration makes it possible to modify the addressing system of the drawers (4) by adding a constant value, for example +8, to the addresses of the disks (20) of one of the drawers, thus preventing this conflict. In a configuration represented in FIG. 2A, a first host system (100b) is connected to a SCSI of twelve disks (20) and two other host systems (100a, 100c) can each be connected to a SCSI of six disks. The possible configurations are, to give a non-limiting example:

- four SCSIs of six disks with the addresses 0, 1, 2, 3, 4, 5 with at least one host system (100) per SCSI (FIG. 2F), or at least two host systems of two SCSIs of six disks each, with chaining (FIG. 2C) or without chaining (FIG. 2B),
- two SCSIs of twelve disks with the addresses 0, 1, 2, 3, 4, 5, 6, 8, 9, 10, 11, 12, 13, each SCSI being able to be connected to at least one host system (FIG. 2E), the address modifications being obtained by means of the switch (11),
- 1 SCSI of twelve disks with the addresses 0, 1, 2, 3, 4, 5, 6, 8, 9, 10, 11, 12, 13 connected to a host system (100b, FIG. 2A) and two SCSIs of six disks with the addresses 0, 1, 2, 3, 4, 5 and 8, 9, 10, 11, 12, 13, connected to at least two host systems (100a, 100c, FIG. 2A), the address modifications being obtained by means of the switch (11). This configuration requires the chaining of two SE/DE converters (7) of two different blocks (6) by means of the link (18, FIG. 2A),
- 1 SCSI of twelve disks with the addresses 0, 1, 2, 3, 4, 5, 8, 9, 10, 11, 12, 13 connected, for example, two four host systems (FIG. 2D).

As a result of these multiple configurations, the user can protect his data by using, for example, mirroring functions, which consist of making a copy of a disk (200e, FIG. 2B) on another disk (200e, FIG. 2B) in the same drawer (4e) or, in order to obtain greater availability, in another drawer. Moreover, according to the invention, the disks (200e, 200d, FIG. 2B) serving as mirrors are chosen, for example, from different drawers (4e, 4d, FIG. 2B). According to FIG. 2C, it is also possible with the subsystem according to the invention for two host systems (100a, 100b) to share data located on disks (200e, 200a) of different drawers (4e, 4a), which disks (200e, 200a) can themselves be mirrored on disks (201e, 201a) of different drawers (4e, 4a). For this configuration, it suffices to connect each host system to two SE/DE converters (7) of the same adapter board (1) of SE/DE converters, and to produce a chaining between an SE/DE converter (7e) of the first host system (100a) and an SE/DE converter (7a) of the second host system (100b) by means of the link (18). In this example, if a disk (200e) is defective, the data being saved on another disk (200a), there is no loss of information; but should the defect involve an entire drawer, the data is still accessible, since the data are saved in a different drawer. Moreover, because of the chaining, when one of the host systems (100a) is defective, the second (100b) can continue to use the shared data.

Figure 2D:
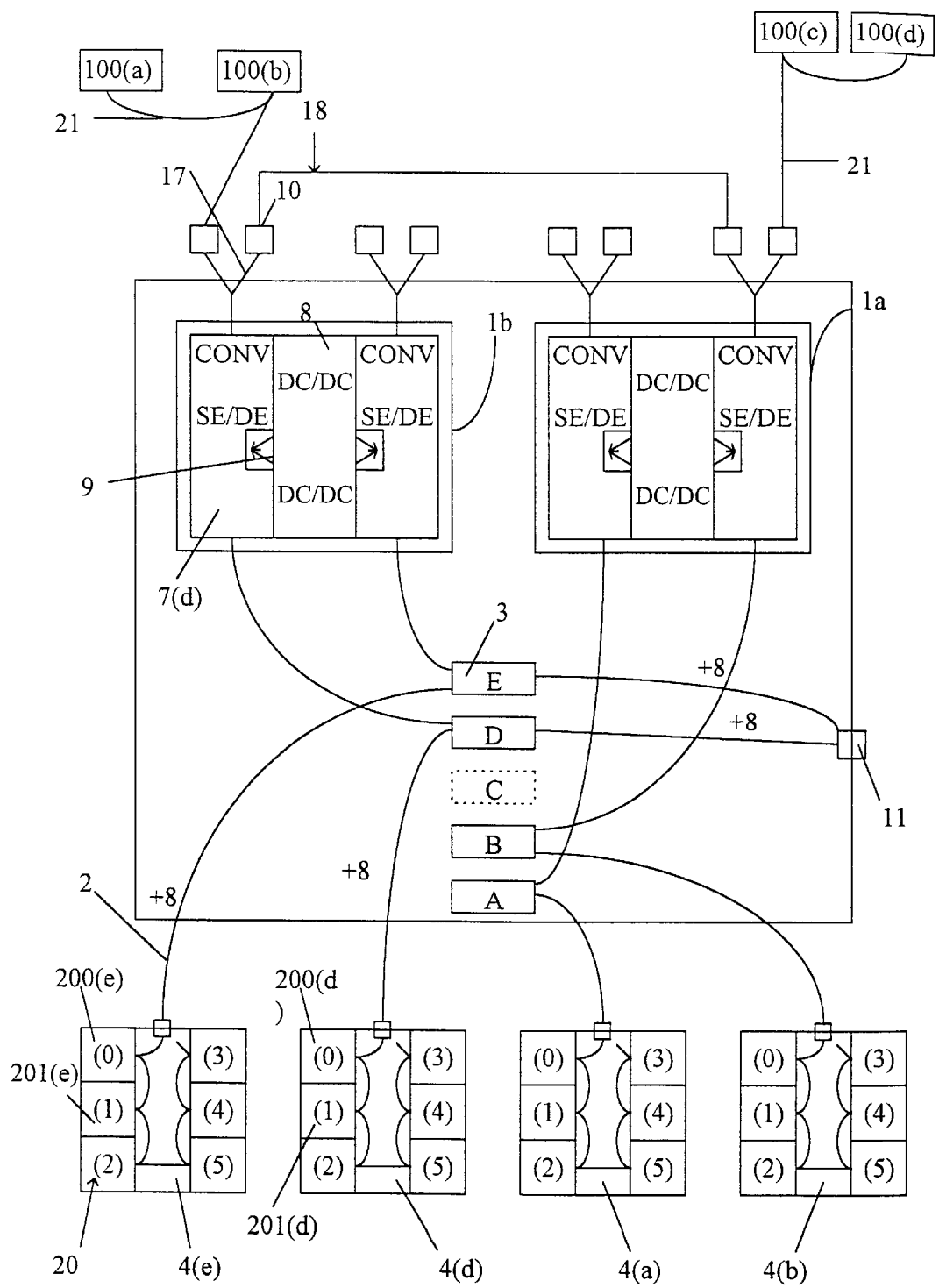
Figure 2E:
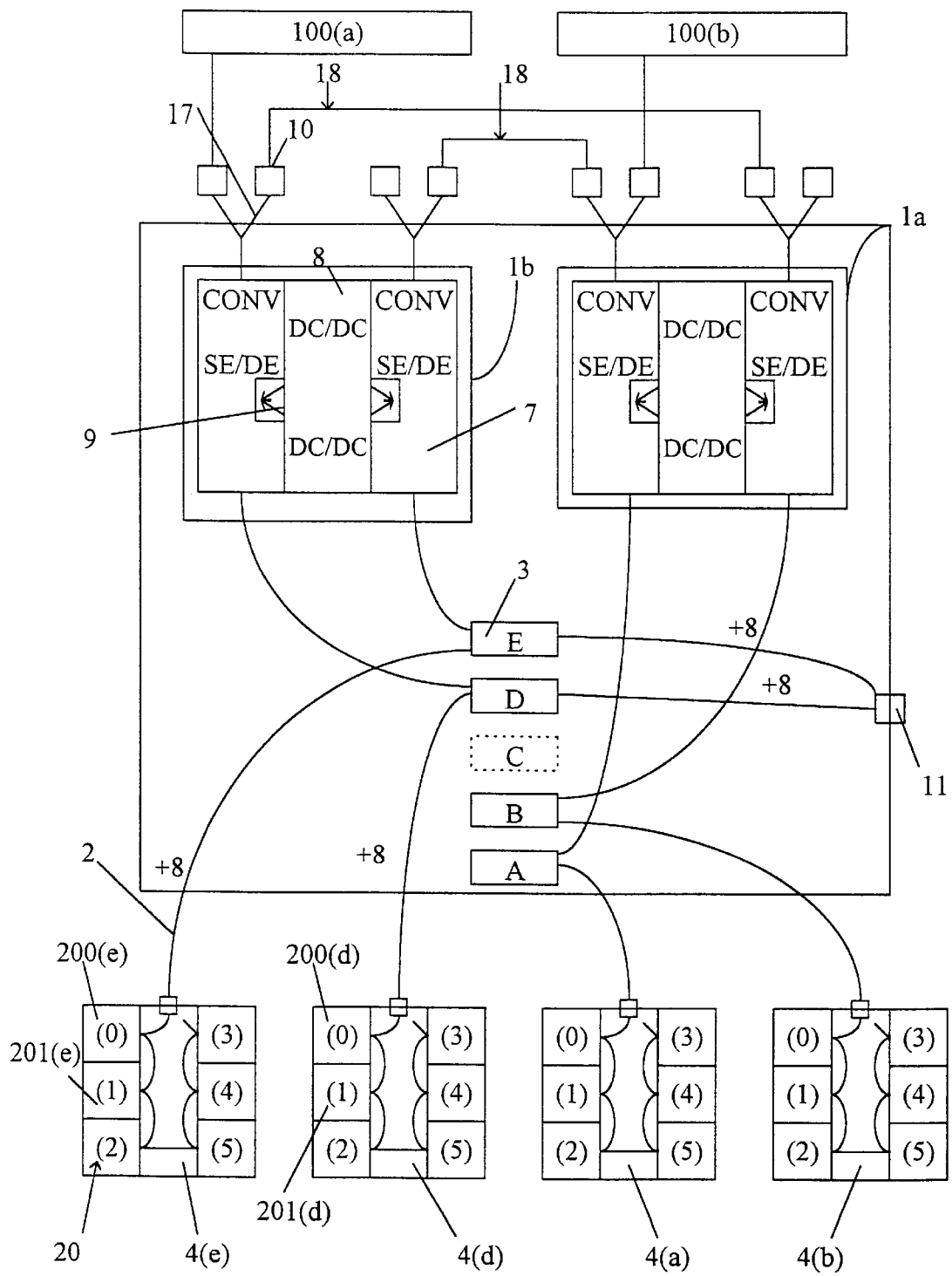
Figure 2F:
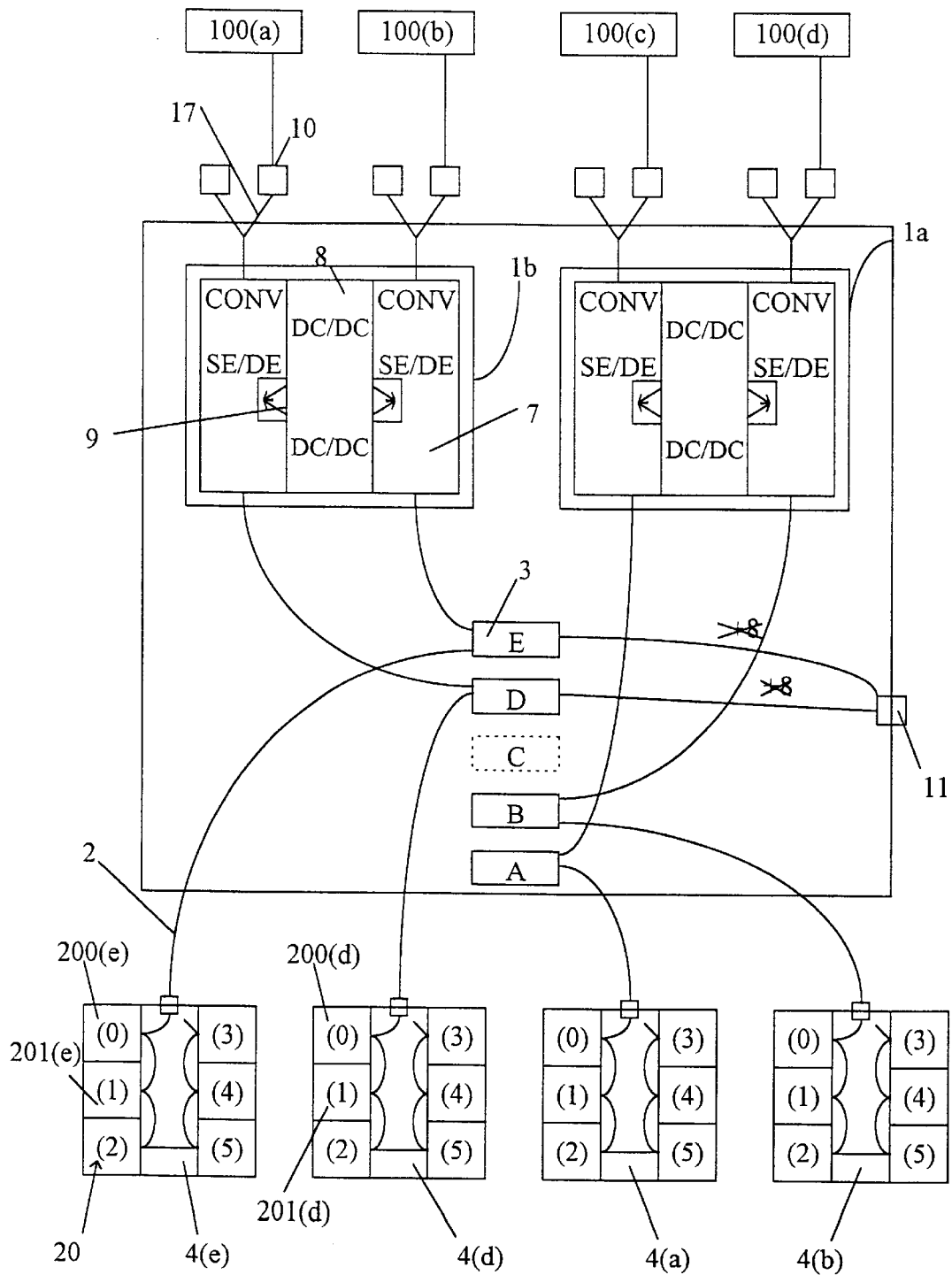

Another possible configuration, represented in FIG. 2D, consists of connecting four host systems to a SCSI of twelve disks. This configuration is obtained by chaining two SE/DE converters (7a, 7d) of two different adapter boards (1) and of then connecting the four host systems using Y cables (21).

Thus, the user has at his disposal a highly available data protection system that can be configured according to his needs.

The possibilities for modifying the addresses of the disks (20) and for a double Y output connection from the SE/DE converters (7) allows for a flexible configuration. The doubling of the power supplies and the converters makes it possible to have high availability.

This disk storage subsystem with multiple configurable interfaces is therefore a highly available system. It has a large storage capacity of up to 24 disks and offers a wide choice of configurations because of the possibility for chaining and its versatility.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A disk storage subsystem with multiple configurable interfaces, comprising at least one interface adapter board (1a, 1b), at least one drawer (4), each drawer (4) adapted to receive a plurality of disks (20), said disks (20) having an addressing system, each drawer (4) being connected to an adapter board (1a or 1b) by SCSI disk interfaces (2), a first adapter board (1a or 1b) comprising a switch (11) for modifying the addressing system of the disks (20) of at least one drawer (4), the adapter board or boards (1a, 1b) each comprising two independent single-ended/differential-ended SE/DE interface converters (7), each SE/DE converter being connected to a drawer (4) and fed by either of two direct current/direct current DC/DC converters (8) of the adapter board (1), and two external SCSI connectors (10) being connected to each SE/DE converter (7).

2. A disk storage subsystem with multiple configurable interfaces according to claim 1, characterized in that the switch (11) is a dual in-line hardware switch.

3. A disk storage subsystem with multiple configurable interfaces according to claim 1, characterized in that the switch (11) is a software switch.

4. A disk storage subsystem with multiple configurable interfaces according to claim 1, characterized in that the switch adds a constant value to the addresses of the disks (20) of two drawers (4).

5. A disk storage subsystem with multiple configurable interfaces according to claim 1, characterized in that the SCSI interfaces (2) connecting the drawers (4) of disks (20) to the controller card (1) are single-ended SE types.

6. A disk storage subsystem with multiple configurable interfaces according to claim 1, characterized in that the SCSI interfaces (17) connecting the adapter board (1) to the host systems are differential-ended DE types.

7. A disk storage subsystem with multiple configurable interfaces according to claim 1, characterized in that each SE/DE converter (7) is connected by a V connection (17) to first and second connectors (10) accessible to the outside of the subsystem for connecting either line terminators or bus adapters of a host system.

8. A disk storage subsystem with multiple configurable interfaces according to claim 1, further including a "wired OR" and characterized in that each of the direct current/direct current DC/DC converters (8) of the blocks (7) of SE/DE converters (6) distributes a voltage to the two SE/DE converters (6) of the corresponding blocks by means of the "wired OR."

9. A disk storage subsystem with multiple configurable interfaces according to claim 1, characterized in that the adapter board (1) comprises a daughter board (12), said daughterboard having a first position for connecting the adapter board to two given drawers of disks, and a second position for connecting the adapter board to two other drawers of disks different from the two drawers connected by the first position of the daughterboard.

10. A disk storage subsystem with multiple configurable interfaces according to claim 1, characterized in that a link (18) joins two connectors (10) of two SE/DE converters (7), for chaining of two drawers (4) of disks (20).

11. A disk storage subsystem with multiple configurable interfaces according to claim 1, characterized in that the SCSI disk interfaces connecting the drawers (4) of disks and/or the SCSI disk interfaces connecting the adapter board or boards (1) to the host systems are of an UltraWide type, and support a maximum data rate of 40 megabytes/s.

12. A disk storage subsystem with multiple configurable interfaces according to claim 1, characterized in that each adapter board (1a, 1b) includes a daughterboard and line terminators (121), incorporated into each daughterboard (12a, 12b) of each associated adapter board (1a, 1b), said line terminators (121) being disposed externally of the drawers (4) of disks (20).

* * * * *

UNITED STATES PATENT AND TRADEMARK OFFICE
CERTIFICATE OF CORRECTION

PATENT NO. : 6,430,686 B1  Page 1 of 1
DATED : August 6, 2002
INVENTOR(S) : Cargemel et al.

It is certified that error appears in the above-identified patent and that said Letters Patent is hereby corrected as shown below:

Column 8,
Line 4, delete "1" and replace with -- 11 --;

Signed and Sealed this

Twenty-second Day of October, 2002

Attest:

Attesting Officer

JAMES E. ROGAN
*Director of the United States Patent and Trademark Office*